United States Patent [19]

Mannix

[11] Patent Number: 4,977,699
[45] Date of Patent: Dec. 18, 1990

[54] BAITING METHOD AND DEVICE

[76] Inventor: James D. Mannix, 8324 Panorama Ridge Ct., Spring Valley, Calif. 92077

[21] Appl. No.: 465,318

[22] Filed: Jan. 16, 1990

Related U.S. Application Data

[63] Continuation-in-part of Ser. No. 319,118, Mar. 6, 1989, abandoned.

[51] Int. Cl.$^5$ ............................................. A01K 97/00
[52] U.S. Cl. ...................................................... 43/4
[58] Field of Search ...................... 43/4, 57.2, 57.1, 55, 43/54.1, 44.84, 44.83, 44.6, 44.2, 43.6, 43.2, 43.16, 43.15, 44.8, 44.4

[56] References Cited

U.S. PATENT DOCUMENTS

| | | | |
|---|---|---|---|
| 1,915,876 | 11/1931 | Wallace | 43/4 |
| 3,193,962 | 7/1965 | Simpson | 43/44.2 |
| 3,392,476 | 7/1968 | Zielaskowski | 43/44.83 |
| 3,521,395 | 7/1970 | Klemkowski | 43/4 |
| 3,925,919 | 12/1975 | Huth | 43/4 |
| 4,559,734 | 12/1985 | Sauer | 43/4 |
| 4,709,498 | 12/1987 | Wolski | 43/4 |

*Primary Examiner*—Richard K. Seidel
*Assistant Examiner*—Chuck Y. Mah
*Attorney, Agent, or Firm*—Henri J. A. Charmasson

[57] ABSTRACT

An open eye awl is used to thread a fishing line leader and straight shank portion of the hook into the bait instead of inserting the barbed point end of the fishing hook at the risk of damaging the bait. This reverse insertion of the hook further minimizes exposed portions of the hook and reliably secures the bait to the fishing line and fishing hook. The leader can be easily installed and removed from the open eye awl before and after insertion even using slippery bait. After baiting, the leader is attached to the fishing line in a conventional manner using a snap clip and loop assembly. The device and method are especially suited for frozen bait. The awl is shaped to create the convenient channel through the bait for the leader and hook shank without apparent deformation, and with minimal holding of the bait.

7 Claims, 1 Drawing Sheet

U.S. Patent
Dec. 18, 1990
4,977,699
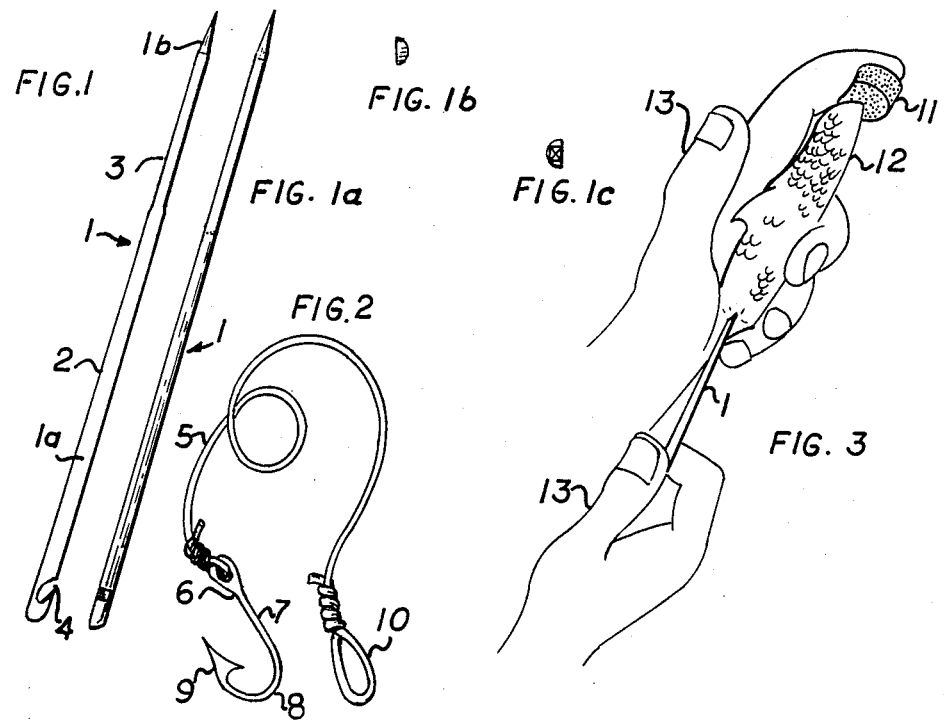
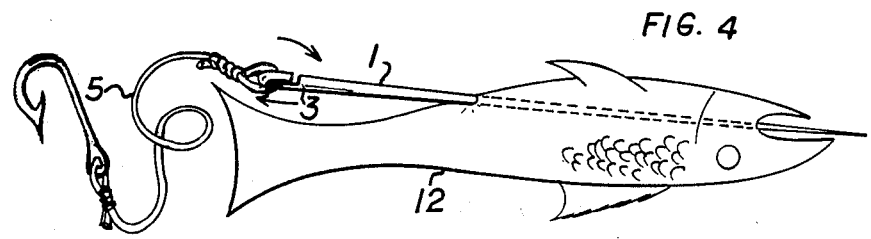
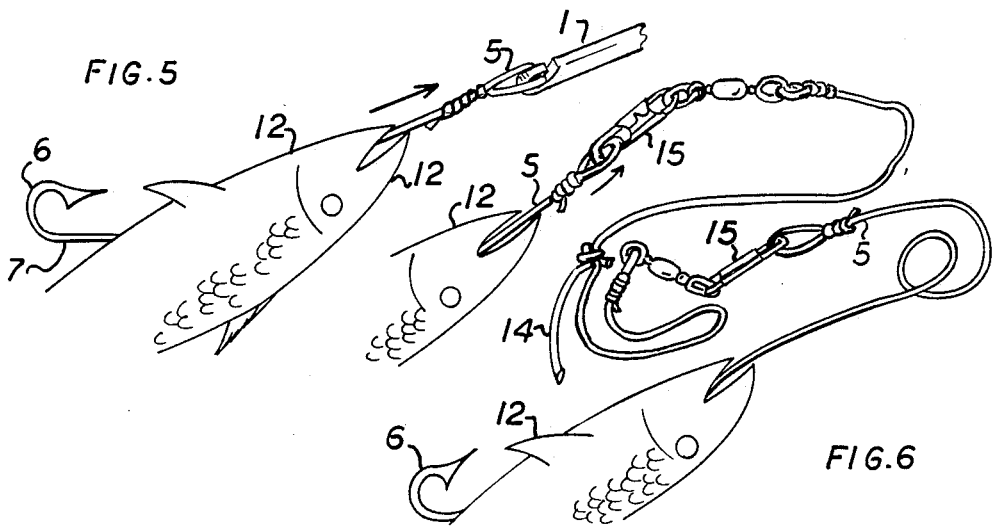

BAITING METHOD AND DEVICE

Prior Application

This is a continuation-in-part of application of application Ser. No. 07/319,118 filed Mar. 6, 1989 now abandoned.

FIELD OF THE INVENTION

This invention relates to fishing tackle. More specifically the invention relates to methods and devices for mounting a frozen bait on a fish hook to be attached to a fishing line.

BACKGROUND OF THE INVENTION

The primary objectives of a baited hook method and device are to: securely attach the bait to the hook so that the bait will not separate during casting or fish strikes; not deform or break the bait during baiting; and allow baiting of a variety of bait, including frozen bait. Any device should be small so that it will not interfere with other fishing equipment, and be easy to store. The device should also be light weight, rugged in construction, pleasing in appearance and low in cost. When the device is used for one type of bait, a minimum of effort to convert to another type of bait is also desirable.

Most of the current baiting methods and devices may do some of these objectives well, but other objectives poorly or not at all. The most common fishing hook has one pointed and barbed end and a curved section connected to a shank section. The barbed end is commonly directly inserted into the bait.

In an alternate method the hook and a section of the line are first threaded through the bait. The hook is then inserted into the bait at a second point. This alternate method provides a more reliable two point support (on the hook and the line) of the bait. A variation of this method wraps a length of line around the bait. Sometimes multiple hooks are used to impale the bait Although relatively simple, the barbed point and direct insertion methods have several advantages. The barbed point can make a larger hole than is desired. The larger hole may also lead to loss of the bait during casting or fish strikes. In addition, the bait must be twisted and deformed to be mounted onto the hook, especially in the two point insertion methods. A deformed, double holed, and wrapped bait is less likely to attract the target fishes.

In an approach to reducing these direct insertion disadvantages, a threading tool is used ("Fishing, An Encyclopedic Guide to Tackle and Tactics for Fresh and Salt Water", by Joseph D. Bates, Jr.). The bait is impaled on a tool having a hook or eye to engage a line leader. The tool and a portion of the leader are then pulled through the bait. A hook attached to the leader is pulled partially, shank first, into the bait. This method avoids severely damaging the bait with the barbed point of the hook.

Examples of these methods and devices are disclosed in U.S. Pat. No. 4,709,498 Wolski; U.S. Pat. No. 4,559,734 Saver et al.; and U.S. Pat. No. 3,521,395 Klemkowski.

When a fragile bait such as a worm or a frozen anchovy is used extreme care must be taken not to deform its natural shape. There is a need for an improved bait mounting tool which reduces the manipulation of the bait during the mounting process and preserves the integrity and natural look of the lure.

SUMMARY OF THE INVENTION

The principal and secondary objects of the invention are:

to provide a method and device for reliably securing bait to a fishing line hook;
to allow attaching a variety of baits, including frozen bait;
to avoid intricate threading steps; and
to avoid deforming the bait.

These and other objects are achieved by using an awl with an open eye to thread a leader and the shank of a hook backwards into the bait. The leader can be easily installed and removed from the open eye of the awl. After threading through the bait, the leader is attached to the fishing line in a conventional manner using a snap clip and loop assembly. The open eye awl can be used for a variety of bait without deforming it because it is not barbed or curved. The awl is sized and shaped to penetrate the bait and form a convenient channel therethrough for the leader and hook-shanks without apparent damage. The device and method are especially suited for frozen bait.

BRIEF DESCRIPTION OF THE DRAWING

FIG. 1 is a left side view of the awl;
FIG. 1a is a top plan view thereof;
FIG. 1b is a back end view thereof;
FIG. 1c is a front end view thereof;
FIG. 2 shows a leader and hook assembly;
FIG. 3 illustrates the initial insertion of the awl into the bait ;
FIG. 4 illustrates the first stage of the threading o leader and hook assembly;
FIG. 5 illustrates the second stage thereof; and
FIG. 6 shows leader assemblies attached to a fishing line.

DESCRIPTION OF THE PREFERRED EMBODIMENT OF THE INVENTION

FIGS. 1, 1a and 1b illustrate the preferred embodiment of the awl 1 used in the practice of the invention. The awl is specifically shaped and dimensioned to penetrate a frozen anchovy bait and create a convenient channel for threading a line leader and the shank of a fishing hook through the bait.

The awl 1 has a flat left side 1a tapering down slightly toward a pointed end 1b. The awl comprises a shank or back portion 2 which extends over approximately two-thirds of its overall length. This shank portion has a semi-circular outline 2a defining the top, right side and bottom faces. The blade portion 3 between the shank and the pointed end 1b has a generally square cross-section. Accordingly, the pointed end 1b forms an elongated pyramid. The flat left side 1a extends over the shank and blade portion of the awl. A notch 4 extends obliquely and backwardly from one of the edges of the flat side and across a portion of that flat side. The notch is sized and shaped to engage a length of fishing line. The awl is normally made of a corrosion resistant material such as stainless steel or plastic. The awl in the preferred embodiment is 11 to 14 cm (4 ½ to 5 ½ inches) long. The width of the left side of the shank is approximately 3 millimeters (⅛ of an inch). The width of the blade is approximately 1.5 millimeters (1/16 of an inch).

Alternate embodiments can vary the dimensions to adapt to various applications.

FIG. 2 shows a leader and hook assembly. The leader 5 is attached to the shank 7 of a fishing hook 6. Fishing hook 6 is composed of a generally straight shank section 7, a curved section 8 and a barbed hook 9. The other end of the leader 5 is formed in a loop arrangement 10. The loop 10 may be attached directly to the fishing line (see FIG. 6).

FIG. 3 shows a bait in an initial phase of the mounting process. The bait 12 is resting against bait support cork 11 while user 13 inserts the awl 1 under the anal fin of the bait 12. In an alternative method the bait support 11 would not be required as bait 12 would be held directly by user 13.

FIG. 4 illustrates the first stage of the threading process. The pointed end is protruding through the mouth at the head of the bait 12. Alternate embodiments can protrude through other areas. The leader 5 is engaged by the notch of the awl 1. Further insertion of awl 1 will drag leader 5 through the anal fin and interior of bait 12, finally exiting at the mouth or nose of the bait.

FIG. 5 shows the leader 5 threaded through the bait 12. The looped portion of the leader 5 is still attached to the awl 1 ready to be disengaged. The fishing hook 6 is proximate the anal fin with a portion of the straight shank portion 7 inserted into the bait 12. If desired, the entire straight section of the fishing hook 6 can be inserted in the interior of bait 12.

FIG. 6 shows several leader assemblies attached to a fishing line. Each leader 5 emanating from baited hook 6 and bait 12 is attached to the fishing line by means of a snap-clip and loop arrangement 15. The multiple snap-clip and loop arrangement allows a plurality of bait 12 and leader assemblies 5 to be attached to the fishing line 14.

Other means of attaching the fishing line to the leader assembly are known, such as split ring assemblies or slip knot harness. The entire leader and hook assembly can also provide additional hooks and loops for attachment of bobbers, floats and sinkers.

It can now be understood that the awl 1, due to its specific configuration can be used to thread the leader 5 and a portion of the fishing hook quickly and with minimal handling of the frozen bait 12.

The sharp pointed end 1b easily breaks the skin of the bait. The square-section blade 3 cuts a channel through the bait that is big enough to allow passage of the leader. The flattened shank 2 is wide enough to allow a notch 4 large enough to accommodate a variety of fishing line sizes, and to act as passageway for the knots of the leader 5.

While the preferred embodiment of the invention has been shown and described, and some alternate embodiments also shown and described, changes and modifications may be made therein within the scope of the appended claims without departing from the spirit and scope of this invention.

What is claimed is:

1. A kit, for attaching a bait to a fishing line hook, said hook including a generally straight shank portion having an end adapted for attachment to a fishing line, wherein said kit comprises:
   said hook;
   a line leader comprising a length of line attached at one end to said hook; and
   an awl consisting of a generally elongated member having a pointed end at one extremity and a notch cut through part of a thickness of said member proximate an end opposite said pointed end.

2. The kit of claim 1, wherein said notch is sized to engage a section of said leader.

3. The kit of claim 2, wherein said member has a blade portion terminating at said pointed end, said blade portion having a square cross-section.

4. The kit of claim 3, wherein said member has a back portion contiguous to said blade portion and having said notch cut therein; and said back portion having a cross-section generally twice as broad as said blade section.

5. The kit of claim 4, wherein the back portion has a semicircular cross-section with a radius commensurate with the width of the cross-section of said blade portion.

6. The kit of claim 5, wherein said back portion has a flat side in line with one side of said blade section.

7. The kit of claim 6, wherein said notch extends from one edge of said flat side backwardly and obliquely across part of said flat side.

* * * * *